ated Oct. 26, 1971

United States Patent

[11] 3,616,052

| [72] | Inventor | August Schwarzkopf<br>Lengerich, Westphalia, Germany |
| --- | --- | --- |
| [21] | Appl. No. | 847,547 |
| [22] | Filed | Aug. 5, 1969 |
| [45] | Patented | Oct. 26, 1971 |
| [73] | Assignee | Windmoller & Holscher<br>Lengerich, Westphalia, Germany |
| [32] | Priority | Aug. 8, 1968 |
| [33] | | Germany |
| [31] | | P 17 79 408.0 |

[54] APPARATUS FOR PROGRESSIVELY TRANSPORTING AND WELDING A WEB OF PLASTICS FOIL
5 Claims, 3 Drawing Figs.

| [52] | U.S. Cl. | 156/366 |
| --- | --- | --- |
| [51] | Int. Cl. | G05g 21/00,<br>B32b 31/20 |
| [50] | Field of Search | 156/358,<br>359, 361, 365, 362 |

[56] References Cited
UNITED STATES PATENTS

| 2,726,707 | 12/1955 | Wellons et al. | 156/358 |
| --- | --- | --- | --- |
| 2,776,509 | 1/1957 | Kienel | 156/358 |
| 2,800,163 | 7/1957 | Rosch | 156/267 X |
| 2,882,956 | 4/1959 | Weist | 156/361 X |
| 3,052,281 | 9/1962 | Hilton | 156/359 |
| 3,053,723 | 9/1962 | Plach et al. | 156/361 X |
| 3,454,447 | 7/1969 | Corbett et al. | 156/358 X |

*Primary Examiner*—Benjamin A. Borchelt
*Assistant Examiner*—Daniel Bent
*Attorney*—Fleit, Gipple & Jacobson ABSTRACT: An apparatus for progressively transporting and heat sealing a web of plastic film comprising means for intermittently feeding the web to a heat-sealing tool and means for reciprocating the heat-sealing tool from an inoperative position spaced from the web to an operative position adjacent the web. The intermittent feed means comprises rotatable conveying means for the web and a first thrust crank drive which incorporates a continuously rotatable first drive shaft and a free wheel clutch. The reciprocating means comprises a second thrust crank drive operatively connected to the heat-sealing tool with the drive incorporating a second drive shaft and means to stop and rotate the second drive shaft. A first switching means is connected to the continuously rotatable first drive shaft and is adapted to act upon the stopping and rotating means to rotate the second drive shaft when the heat-sealing tool is in an inoperative position. A second switching means is connected to the second drive shaft and is adapted to act on the stopping and rotating means to stop the second drive shaft when the heat-sealing tool is in an operative position. Time switch means is provided for temporarily halting the second drive shaft when the heat-sealing tool is in an operative position and is adapted to act on the stopping and rotating means to rotate the second drive shaft again with a third switching means on the second drive shaft being adapted to act on the stopping and rotating means to stop the second drive shaft when the heat-sealing tool is in an inoperative position.

INVENTOR
August SCHWARZKOPF
By
Fleit, Gipple & Jacobson
his ATTORNEYS

APPARATUS FOR PROGRESSIVELY TRANSPORTING AND WELDING A WEB OF PLASTICS FOIL

The invention relates to an apparatus for progressively transporting and welding a web of plastics foil, particularly a folded web for the manufacture of plastic sacks or bags.

In known equipment for transporting and welding such a web, means are provided for feeding the web step-by-step to a welding tool and there are further means for reciprocating the welding tool towards and away from the web. These two means, which can be in the form of rotary drives, are positively interconnected so that the tool drive will be operating to reciprocate the tool when the web drive is switched off, i.e., when the web is at a standstill. The tool drive is conventionally a thrust cam against which control linkage of the welding tool is biassed under spring action. The arrangement is such that the welding tool is resiliently advanced by the cam towards the web and is later positively lifted off the web again by being in positive engagement with the cam. The standstill period which is necessary during welding is ensured by dimensioning the control linkage such that the welding tool will reach the web under the spring force before the cam has reached a lower dead center position. The tool then remains on the web until it is lifted off again by the cam which continues to rotate. By altering the length of the control linkage one can vary the time at which the welding tool is applied to the web and thus the welding period during which it remains on the web.

In the known equipment, the welding period can be varied only by adjusting the control linkage, i.e., only while the apparatus is inoperative. Also, the welding period can be set only with considerable difficulty because by adjusting the length of the control linkage one simultaneously alters the start and finish of the welding period relatively to the start and finish of the time during which the web is at a standstill.

According to the present invention, apparatus is provided for progressively transporting and welding a web of plastic foil. This apparatus comprises means for feeding the web step-by-step to a welding tool and means for reciprocating the welding tool from an inoperative position spaced from the web to an operative position adjacent the web, with the web feeding and tool reciprocating means being operated by respective rotary web and tool drives which are adapted to run at independently adjustable rotary speeds, wherein the tool drive is adapted to be started with the welding tool in the inoperative position by switching means which are actuated by the web drive when the web is near the end of a feeding step. The tool drive is adapted to be halted temporarily by self-actuated time switch when the welding tool has reached the operative position, the period during which the tool drive is thus temporarily halted being set on the time switch, and the tool drive is adapted to be switched off again by self-actuated switching means when the welding tool is back in the inoperative position.

By means of the invention, it is possible to adjust the welding period at any time during the operation of the apparatus by altering the setting on the time switch which will generally be mounted on a readily accessible console or table for the electrical equipment. The switching means actuated by the web drive for the purpose of starting the tool drive permits a once and for all setting of the instant at which the tool is applied to the web, this being effected independently of the selected rotary speeds of the web and tool drives and independently of the chosen welding period and preferably such that the tool is applied to the web at the instant when the web comes to rest. As a precautionary measure, the tool should be applied a few degrees of rotation of the tool drive subsequent to the web coming to rest so as to make quite sure that the web will actually be at rest. The welding period can thus always substantially coincide with the instant at which the web comes to rest. It can be readily checked because only the moment at which the tool is lifted off again and the time at which the web commences its next feeding step need to be observed. The optimum welding period will have been set if these two times coincide or if, for safety reasons, the tool is lifted off a few degrees of rotation of the tool drive before the web commences to move again. If such optimum welding period is too short to ensure an efficient weld then the period of standstill of the web can be increased by reducing the rotary speed of the web drive and correspondingly increase the period set on the time switch. Conversely, if the welding period for a particular rotary speed of the web drive is markedly shorter than the time during which the web is at rest, the rotary speed of the web drive and thus the output of the apparatus can be increased until the total standstill period is substantially equal to the required welding period. All these adjustments can be effected during operation of the apparatus and can be controlled by observing the times at which the tool is lifted off the web and at which the web starts the next feeding step.

In order to provide some measure of control independently of the period set on the time switch for reasons of safety, i.e., to ensure that the web will not start to move before the tool has lifted off, the apparatus is preferably provided with a safety switch which is actuated by the web drive and is adapted, in the operative position of the welding tool, to switch the tool drive on again in time for the tool to commence its return to the inoperative position before the web is started to be fed a further step. The safety switch overrides the time switch and therefore terminates the inadvertently long period that has been set on the time switch. Consequently, interruptions that could otherwise be caused by tearing of the web by the welding tool are avoided and in any case the safety switch will prevent the longest possible welding period at a particular rotary speed of the web drive from being exceeded.

In one form of the invention, the tool drive is associated with a brake which is effective when the tool drive is off and released when the tool drive is on. In this way one can accurately predetermine the movements of the welding tool that are imparted to it by the tool drive.

It is also preferred to provide signal lamps or other indicating means for keeping a check on the various stops and starts of the moving parts and to facilitate adjustment.

An example of the invention is illustrated in the accompanying diagrammatic drawings, wherein.

Figure 1:
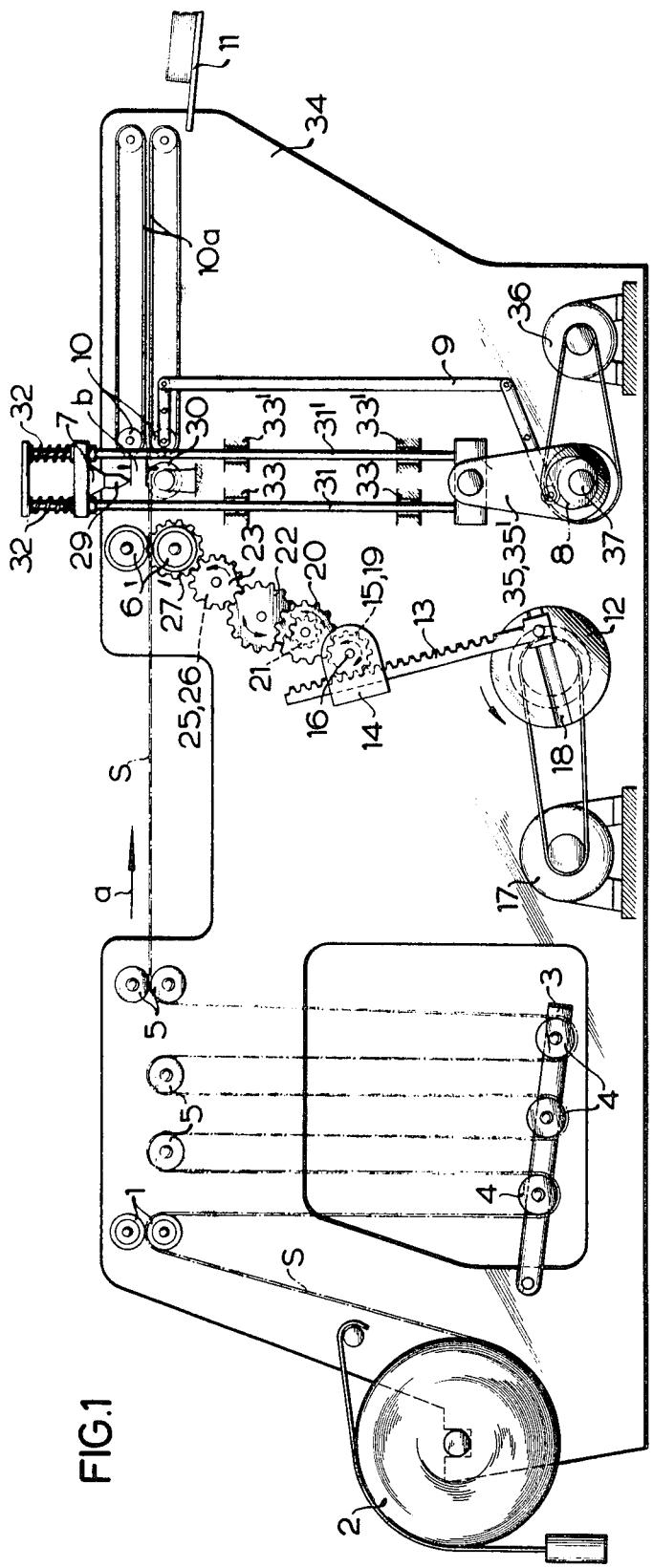
FIG. 1 is a side elevation of a transporting and welding apparatus.
Figure 2:
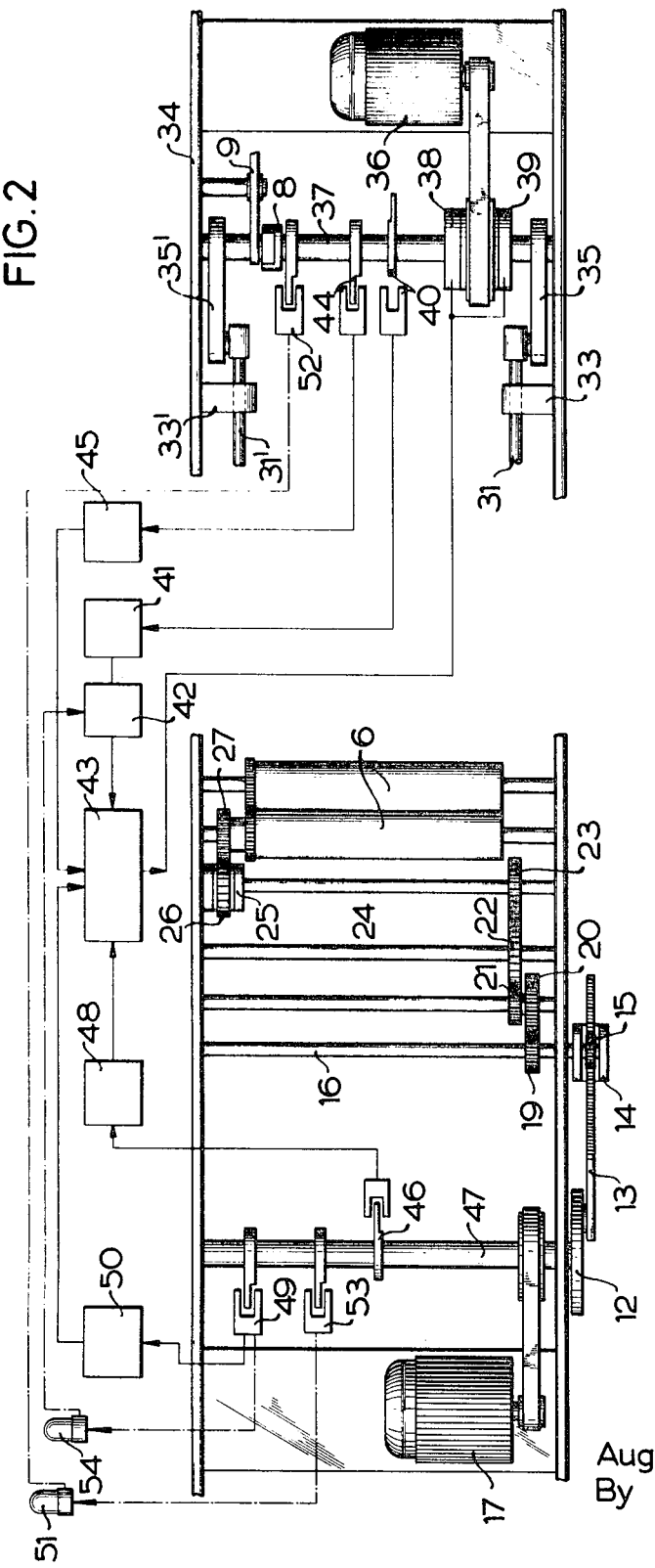
FIG. 2 is a fragmentary plan view thereof.

The apparatus of FIGS. 1 and 2 is suitable for a bagmaking machine in which a thermoplastic foil S has been folded longitudinally to double thickness and is transported in the direction of the arrow $a$ so as to be welded and severed transversely to the fold line. The fold line will form the bottom of each bag, the weld lines will form the sides and the mouth of the bag will remain open for filling.

The web S is uniformly withdrawn from a supply roll 2 by means of feed rollers 1 and is fed to a compensating rocker 3 having direction-changing rollers 4 which, in cooperation with stationary direction-changing rollers 5, form a plurality of loops in the web. The compensating rocker 3 permits the web to be withdrawn from the supply roll 2 at a constant speed and fed step-by-step by a pair of feed rollers 6. During each standstill period of the web, which can be varied as hereinafter described, a reciprocatable welding tool 7 will produce a weld line transversely to the length of the web and sever a bag which can then be engaged by a pair of feed rolls 10 which are controlled by a cam 8 via linkage 9 and which have a higher rotary speed than the rollers 6. The rollers 10 are located at the input of, and preferably constitute means for driving, conveyor belts 10$a$ which feed each severed bag separately to a stacking table 11.

The pair of feed rollers 6 is driven by the rotary drive 12 of a thrust crank mechanism of which the thrust or connecting rod 13 is in the form of a rack. The rack 13 passes through a pivoted slide member 14 where it engages a pinion 15 fixed to the rotatable pivotal axis 16 of the slide member 14. The drive 12 is rotated by a variable speed motor 17 or through transmission gearing from the main motor of the bagmaking machine. The crank pin is adjustable in a radial groove 18 of the drive disc so as to permit variation of the stroke executed by the rack 13. The pinion 15 is turned clockwise during half a revolution of the drive 12 and counterclockwise during the other half revolution of the drive 12. Such to and fro swinging of the pinion 15 is transmitted by gears 19, 20, 21, 22 and 23 and by a transmission shaft 24 to a freewheeling or clutch mechanism 25 which is coupled to the feed rollers 6 through gears 26, 27. The arrangement of the clutch mechanism 25 is such that it will transmit to the feed rollers 6 only that swing of the pinion 15 which is effective to cause the feed rollers 6 to advance the web S in the direction of the arrow $a$, the clutch 25 being adapted to freewheel when the pinion 15 is swinging in the opposite direction. In this way the web S is fed progressively, i.e., step-by-step. The amount of feed during each step depends on the dimensions of the bags to be made and is adjustable by displacing the crank pin in the groove 18 of the drive 12. The standstill periods between successive feeding steps of the web of course correspond to the time during which the clutch mechanism 25 is freewheeling.

The aforementioned welding tool 7 which is located downstream of the pair of feed rollers 6 comprises an electrically heated welding and severing beam 29 which extends transversely to the web S and above the plane in which the web is transported, and counterpressure rollers 30 being located below the welding beam. The welding tool is displaceable along a pair of rods 31, 31' and suspended from shoulders thereof by means of springs 32. The rods are mounted in bearings 33, 33' which are located on both sides of the web S and are supported by a frame 34 of the apparatus. The welding tool is reciprocated by means of a rotary crank drive 35, 35' in the form of an eccentric. The drive 35, 35' is rotated by a motor 36 the speed of which can preferably be varied. The rotary speed of the tool drive is larger than that of the web drive 12 for the feed rollers 6. The drive 35, 35' can be switched on and off by an electromagnetic clutch 38 which is associated with an electromagnetic brake 39 and which is seated on a shaft 37 of the eccentric drive. The clutch and brake are synchronized so that the brake becomes effective as soon as the clutch is open, and vice versa. Instead of the clutch and brake, the drive motor 36 may be in the form of a motor with a displaceable armature having a quick-acting brake which is ineffective when the motor is switched on and effective when the motor is switched off. The brake prevents undesired residual rotation of the tool drive after it has been switched off.

On the shaft 37 of the eccentric there are switching means in the form of a magnetic impulse generator or switch 40 which generates a switching impulse in the lower dead center position of the tool drive, i.e., when the welding beam 29 has been applied to the web S. After amplification in an amplifier 41, the generated impulse switches the electromagnetic clutch 38 off by acting through a time switch 42, which may be in the form of a time relay, and through a mixed amplifier 43, the magnetic brake 39 being simultaneously switched on so that the drive 35, 35' will come to a standstill almost instantaneously. The time switch 42 is provided with a time delay, the period of which can be set. After the set time delay has expired, the time switch will switch the clutch 38 on again and the brake 39 off so that the rotary tool drive will now resume its rotation to assume the upper dead center position illustrated in FIG. 1 at which the tool drive is stopped again by further switching means 44 which generate an impulse that passes through an amplifier 45 and the mixed amplifier 43 to disengage the clutch 38 and operate the brake 39. In this dead center position of the tool drive, the welding beam 29 will be in an inoperative position at a spacing $b$ from the plane of the web S. To start a new operating cycle, the tool drive 35, 35' is switched on by switching means 46 in the form of an impulse generator mounted on a drive shaft 47 of the web drive 12. The switching means 46 on the shaft 47 are arranged so that it will generate an impulse near the end of each feeding step of the Web S and transmit the impulse through an amplifier 48 and the mixed amplifier 43 to the clutch 38 which starts the tool drive 35, 35' and releases the brake 39.

A safety switch in the form of an impulse generator 49 connected to an amplifier 50 is provided on the shaft 47 and it overrides the time switch 42. This safety switch 49 operates through the amplifier 50 and mixed amplifier 43 to engage the clutch 38 in good time before termination of the standstill period of the web to ensure that the welding tool will definitely have lifted off the web when the latter commences its next feeding step. The safety switch 49 therefore prevents faults from occurring in the bagmaking machine if the time switch 42 has inadvertently been set to an excessively long time delay.

The function and adjustability of the apparatus will now be described with reference to the graph of FIG. 3 in which time is plotted along the abscissa and distance along the ordinate.

The sinusoidal cycle Z of the rotary web drive 12 is utilized to drive the feed rollers 6 only during the time indicated in full lines. This is effected by the aforementioned freewheeling mechanism or clutch 25. Accordingly, the web S executes a feeding step between the times A and $A_1$ while it remains stationary during the period T between the times $A_1$ and $A_2$. The cycle Z is associated with a cycle Z' of the tool drive 35, 35'.

Near the end of each feeding step of the web S, the impulse generator 46 switches the tool drive 35, 35' on at the instant $A_{46}$ in good time to ensure that the tool 7 will have been applied to the web S at the time $A_1$ when the web is stationary. The tool drive is stopped temporarily in its lower dead center position at the time $A_{42}$ by means of the time switch 42. After expiration of the period $S_t$ set on the time switch 42, i.e., at the instant $A'_{42}$, or not later than the instant $A_{49}$, the tool drive will resume its operation, in the latter case by virtue of the safety switch 49 without regard to the time setting on the switch 42. The tool drive will therefore be effective to lift the tool off the web either at the time B determined by the time switch 42 or at the very latest at the time $A_2$ which is determined by the safety switch 49 and which coincides with the end of the standstill period of the web. The welding period $t$ or $t_o$ therefore corresponds to the time difference between the fixed time $A_1$ and the time B determined by the time switch 42 or the time $A_2$ determined by the safety switch 49. The welding period $t_o$ is an optimum because it is practically equal to the standstill period T of the web. The welding period $t$ can be varied by changing the period $S_t$ set on the time switch 42 and the welding period can therefore be adapted to the properties of the web from which the bags are being made. If, as shown in FIG. 3, the welding period $t$ is shorter than the optimum welding period $t_o$ possible at any particular rotary speed of the web drive, then this rotary speed and thus the output of the apparatus can be increased until the selected welding period $t$ is the optimum for the increased rotary speed of the web drive, i.e., substantially equal to the resultant standstill period T of the web. However, if the set welding period $t$ is longer than the optimum $t_o$, then the rotary speed of the web drive must be reduced so that the set welding period will correspond to the optimum at the reduced rotary speed. The apparatus thus permits optimum adjustment of the welding period in every case.

The rotary speed of the tool drive 35, 35' is chosen to be as large as is permitted by the masses that have to be moved. It is adjustable to ensure that the tool will be in its operative position on the web as near as possible to the time $A_1$, i.e., upon commencement of the standstill period of the web, even if the rotary speed of the web drive is changed. However, adjustability of the tool drive can be dispensed with if the tool drive is switched on by the switch 46 at the lowest rotary speed of the web drive. An increase in the speed of the web drive will then cause belated application of the tool to the web, i.e., a certain reduction in the optimum welding period, but since this reduction will be very small it is in many cases acceptable.

Figure 3:
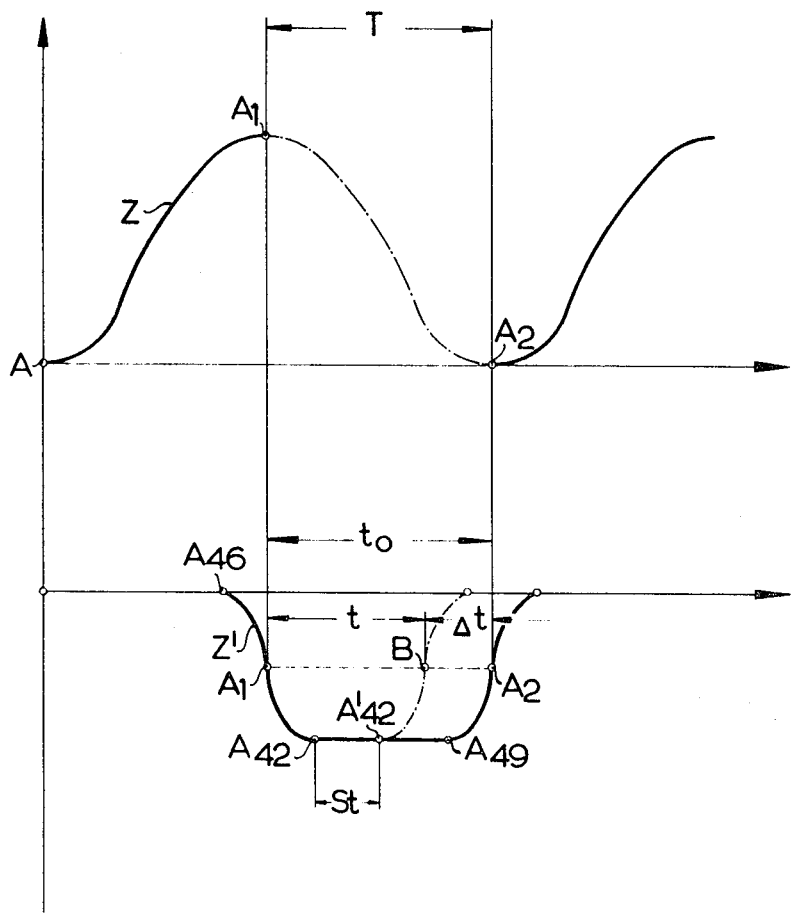
FIG. 3 is a time-distance graph for explaining the function of the FIG. 1 apparatus, time being recorded along the abscissa and distance along the ordinate.

The graph of FIG. 3 shows that, in view of the fixed time $A_1$ at which the tool will commence welding, the time difference $\Delta t$ between the optimum welding period $t_o$ and the selected period $t$ is equal to the interval between the time B determined by the time switch 42 at which the tool 7 is lifted off the web S and the time $A_2$ at which the web commences its next feeding step. These two times can be readily controlled during operation of the apparatus by signal means.

One of these signal means comprises a signal lamp 51 (FIG. 2) which may be green in color. It is switched on at the instant B (FIG. 3) by a switch 52 on the shaft 37 and switched off again at the instant $A_2$ by a switch 53 on the shaft 47. The lamp 51 therefore indicates the period $\Delta t$ that is still available for prolonging the set welding period $t$ or by which the rotary speed of the web drive and thus the output of the apparatus can be increased until the set welding period $t$ has reached the optimum at the increased rotary speed. If the lamp flashes on momentarily, the optimum position will have been reached.

The other signal means comprise a preferably red signal lamp 54 which is switched on by the safety switch 49 at the time $A_{49}$ (FIG. 3) and switched off again by the time switch 42 at the time $A'_{42}$, i.e., after expiration of the set switching period. Accordingly, the lamp 54 will light up only if the optimum welding period $t_o$ has been exceeded such as by an inadvertently wrong setting to an excessive switching period $S_t$. The time during which this lamp is lit up shows by how much the set welding period is too short and it will not light up at all if the time switch 42 starts the tool drive at the time $A'_{42}$ which is before the time $A_{49}$ at which the safety switch 49 would initiate rotation of the tool drive. The lamp 54 permits the optimum welding period to be achieved for the apparatus either by reducing the switching time $S_t$ of the switch 42 or by reducing the rotary speed of the web drive 12. The optimum has been achieved if the lamp 54 no longer lights up and the lamp 51 flashes on only momentarily.

It will be evident that the optimum setting of the apparatus can be achieved rapidly and accurately while the apparatus and hence the bagmaking machine are in operation.

I claim:

1. Apparatus for progressively transporting and heat sealing a web of plastic film comprising means for intermittently feeding the web to a heat-sealing tool and means for reciprocating the heat-sealing tool from an inoperative position spaced from the web to an operative position adjacent the web, said intermittent feed means comprising rotatable conveying means for the web, and a first thrust crank drive, said first thrust crank drive including a continuously rotatable first drive shaft, gear drive means connected to said first drive shaft and a freewheel clutch mounted to said gear drive means, said reciprocating means comprising a second thrust crank drive operatively connected to the heat-sealing tool, said second thrust crank drive comprising a second drive shaft and means to stop and rotate the second drive shaft, a first switching means connected to the continuously rotatable first drive shaft and adapted to act on said stopping and rotating means to rotate the second drive shaft when the heat-sealing tool is in an inoperative position, a second switching means connected to the second drive shaft and adapted to act on the stopping and rotating means to stop the second drive shaft when the heat-sealing tool is in an operative position, a means is provided for temporarily stopping the second drive shaft when the heat-sealing tool is in an operative position and is adapted to act on the stopping and rotating means to rotate the second drive shaft again, said third switching means being adapted to act on the stopping and rotating means to stop the second drive shaft when the heat sealing tool is in an inoperative position.

2. Apparatus according to claim 1, wherein said stopping and rotating means comprises a brake which is operative when said reciprocating means is off and released when said reciprocating means is on.

3. Apparatus according to claim 1, including a safety switch adapted to be actuated by said first drive shaft and, in the operative position of the heat-sealing tool, to act on said stopping and rotating means to rotate said second drive shaft again in time for the tool to commence its return to the inoperative position before the web is started to be fed.

4. Apparatus according to claim 3 including a second signal lamp for indicating an excessively long period set on the said time switch during which said second drive shaft is temporarily halted, said second lamp being adapted to be switched on by said safety switch and being adapted to be switched off again upon expiration of the period set on the time switch.

5. Apparatus according to claim 1, including means for checking the heat-sealing time of the heat-sealing tool in the operative position and to facilitate the setting of an optimum heat-sealing period, said checking means comprising a signal light adapted to be switched on by a fourth switching means on said second drive shaft at the instant when the heat-sealing tool commences to move from the operative to the inoperative position and adapted to be switched off by a fifth switching means on said first drive shaft at the instant when the web is about to be fed.